United States Patent [19]

Markle et al.

[11] Patent Number: 5,005,843
[45] Date of Patent: Apr. 9, 1991

[54] CHUCK MECHANISM FOR DETACHABLY CONNECTING IMPELLER SHAFT AND DRIVE UNIT OF MIXING APPARATUS

[75] Inventors: Stephen Markle, Rochester; William Hutchings, Fairport; Marlin Schutte; Richard Howk, both of Rochester, all of N.Y.

[73] Assignee: General Signal Corporation, Rochester, N.Y.

[21] Appl. No.: 458,475

[22] Filed: Dec. 28, 1989

[51] Int. Cl.$^5$ .............................................. B23B 31/107
[52] U.S. Cl. ...................... 279/29; 279/1 B; 279/81; 403/318; 403/328; 403/356
[58] Field of Search ............... 279/1 B, 1 SG, 1 T, 279/23 R, 24, 29, 79, 81; 403/356, 355, 318, 328

[56] References Cited

U.S. PATENT DOCUMENTS

| | | | |
|---|---|---|---|
| 1,862,337 | 6/1932 | Emrick | 279/79 |
| 2,667,357 | 1/1954 | Andreasson | 279/81 |
| 2,854,238 | 9/1958 | Kennell | 279/81 |
| 3,576,076 | 4/1971 | Weissman | 433/165 |
| 4,013,154 | 3/1977 | Brown . | |
| 4,064,708 | 12/1977 | Breads . | |
| 4,108,259 | 8/1978 | Dixon et al. . | |
| 4,146,240 | 3/1979 | Nielsen | 408/239 R |
| 4,366,722 | 1/1983 | Hasler . | |
| 4,551,117 | 11/1985 | Kunz . | |
| 4,643,609 | 2/1987 | Biass . | |
| 4,682,780 | 7/1987 | Kurama et al. | 279/79 |
| 4,784,543 | 11/1988 | Mitchell et al. . | |
| 4,810,139 | 3/1989 | Regan . | |
| 4,836,708 | 6/1989 | Chambers et al. . | |
| 4,842,439 | 6/1989 | Caldwell et al. . | |

FOREIGN PATENT DOCUMENTS

| | | | |
|---|---|---|---|
| 921695 | 4/1982 | U.S.S.R. | 279/1 B |
| 965612 | 10/1982 | U.S.S.R. | 279/1 B |

Primary Examiner—Steven C. Bishop
Attorney, Agent, or Firm—Martin Lukacher; Milton E. Kleinman

[57] ABSTRACT

Chuck mechanisms quickly connect and enable quick disconnection of an impeller shaft of a mixer from the drive shaft of the motor unit. A spindle has a keyway which enables a key, either a detent key which is movable in the keyway or a key which is provided by pins extending from the shaft, to be aligned in locking position where the key transfers the thrust from the spindle to the shaft or an unlocked position where the shaft is rotated out of the locking position and may be removed from the spindle. The key is retained in locking position by an outer sleeve or collar having a slot which enables the key to move away from the shaft when the shaft is rotated to the unlocked position. When the collar is rotated to move the slot away from the key, the key is locked against outward movement. The keyway may be sufficiently large to enable the flat on the shaft to tilt the key so as to provide wedging action of the key against the spindle sleeve and tighten the shaft on the sleeve so as to preclude slipping when greater torque is needed by the mixing impeller. In another embodiment, a tapered bolt is used in a cross-bore through the spindle sleeve, which bolt and a flat with a cylindrical undercut define a keyway. A tapered shoulder portion of a bolt which extends into the keyway defines a guide which permits the shaft to be inserted only with the flat in alignment with the cross-bore and keys the sleeve to the shaft when the bolt is screwed into the cross-bore.

22 Claims, 6 Drawing Sheets

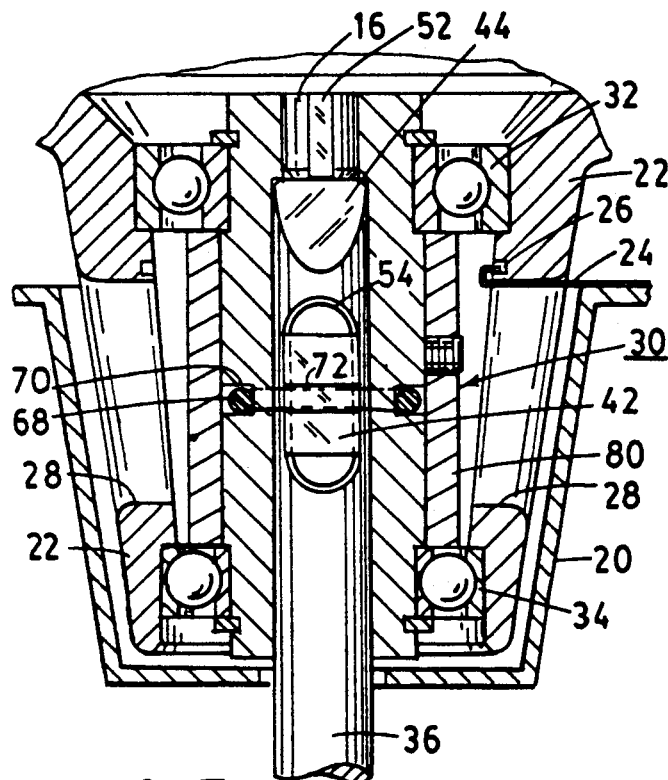
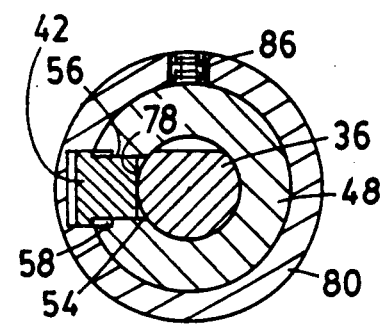
FIG. 4
FIG. 5
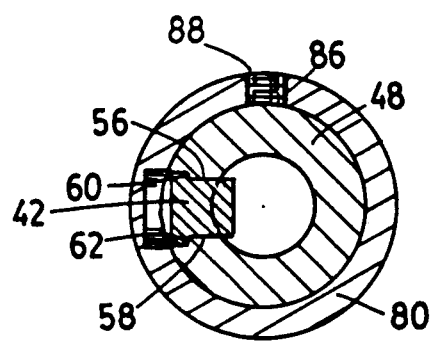
FIG. 7
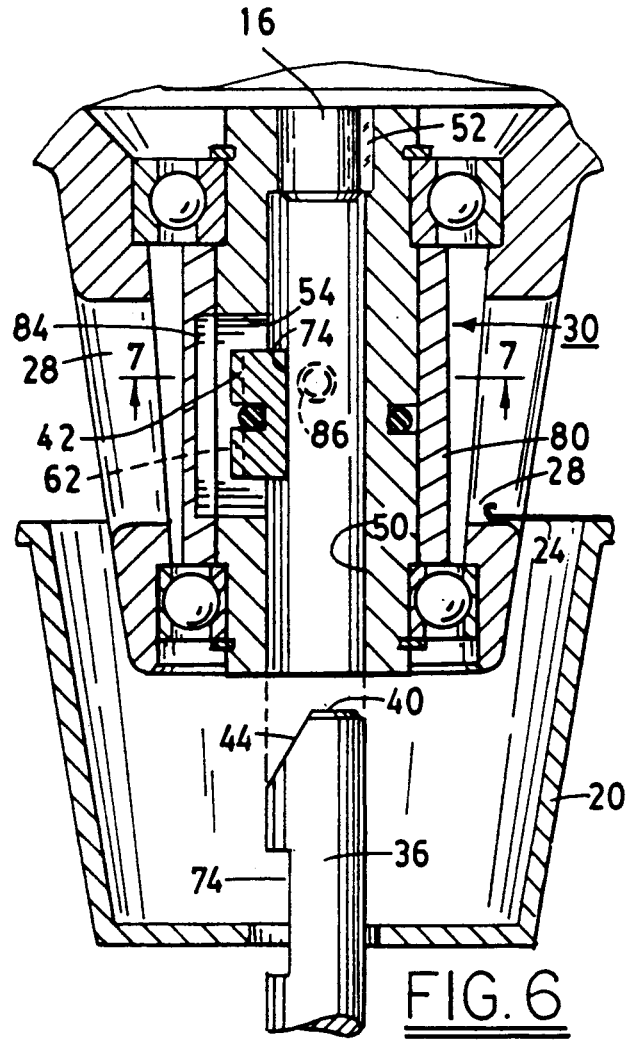
FIG. 6

CHUCK MECHANISM FOR DETACHABLY CONNECTING IMPELLER SHAFT AND DRIVE UNIT OF MIXING APPARATUS

DESCRIPTION

The present invention relates to chuck mechanisms or couplings for detachably connecting an output shaft to the rotatable member of a drive unit, and more particularly to mechanisms which provide for quick disconnect and connection of a shaft to a drive without the need for special tools.

The invention is especially suitable for use in apparatus for mixing fluids and fluid suspensions for commercial and industrial purposes. The invention enables impeller shafts of different types to be connected to a motor drive unit, containing a motor and suitable gearing, rapidly and without special tools and while the mixer is installed on a tank or other vessel.

Couplings for connecting a rotating member to a shaft have been used and investigated for use in applications extending from automobiles to machine tools. Various arrangements of bolted flanges, tapered shafts, set screws, keys and collets have been suggested. The general technological background of such various types of shaft couplings is represented by the following more recent U.S. patents, and this list is not exclusive: Brown, 4,013,154, Mar. 22, 1977; Breads, 4,064,708, Dec. 27, 1977; Dixon, et al., 4,108,259, Aug. 22, 1978; Hasler, 4,366,722, Jan. 4, 1983; Kunz, 4,551,117, Nov. 5, 1985; Biass, 4,643,609, Feb. 17, 1987; Mitchell, et al., 4,784,543, Nov. 15, 1988; Caldwell, et al., 4,842,439, June 27, 1989; Chambers, et al., 4,836,708, June 6, 1989; and Regan, 4,810,139, Mar. 7, 1989. Nevertheless, the couplings which have been suggested have been found wanting when a quick connection and disconnection capability is required together with the capability of transferring torque of magnitudes sufficient for mixing applications, where liquids and liquid suspensions which may be quite viscous must be handled.

Accordingly, it is the principal object of the present invention to provide coupling mechanisms which can provide for the quick disconnect and connection of an output shaft to a drive unit.

It is another object of the present invention to provide chuck mechanisms which enable the rapid connection and disconnection of an output shaft, such as the impeller shaft of a mixer, to a drive unit having a motor, gears and other mechanisms for rotating the shaft, with sufficient torque for mixing applications.

It is a still further object of the present invention to provide improved chuck mechanisms which provide for rapid connection and disconnection of a shaft from a drive unit with a minimum of ordinary tools such as a single Allen head wrench.

Briefly described, a mechanism in accordance with the invention provides for detachable coupling of a rotatable drive member to a shaft. The mechanism has a collar or sleeve, which may be a spindle, connected to the drive member. The shaft, which may be a mixer impeller shaft, is receivable in the collar in coaxial relationship therewith. The shaft is rotatable independently of the collar with respect thereto into and out of locking position. The locking position is defined by a keyway in at least one of the shaft and the collar and a key captured in and rotatable with either the shaft or the collar. Means are provided which are engageable with the key for releaseably retaining the key in the locking position. In a preferred embodiment of the invention, the key is a detent key which is biased for movable inwardly towards the shaft and is movable by the shaft by engagement thereof by a flat on the shaft, when the shaft is rotated out of locking position. An outer collar or sleeve has a slot which provides clearance for the movement of the key in the outward direction and is rotated to a position where the slot is out of alignment with the key and the peripheral surface of the outer collar engages and retains the key in locking position. The bias on the detent key may be provided by an elastic O-ring which extends around the key and the spindle in which the key reciprocates as the shaft moves into and out of locking position. By turning the outer collar so that the slot aligns with the key, the shaft can be manually twisted forcing the key into the slot in the outer collar and allowing the disconnection of the shaft.

The foregoing and other object features and advantages of the invention, as well as different embodiments thereof, will become more apparent from the reading of the following description in connection with accompanying drawings in which:

FIG. 1 is an elevational view, partially in section showing a mixer drive unit and a chuck mechanism which provides for quick disconnect of an impeller shaft from a drive unit in accordance with a presently preferred embodiment of the invention;

FIGS. 2 and 3 are sectional views taken along the lines 2—2 and 3—3 of FIG. 1, respectively;

FIG. 3A is a view similar to FIG. 3 when the shaft is rotating and transferring torque to the load;

FIG. 4 is a view similar to FIG. 3 showing the shaft after it is turned out of the locking position (90°) from the position shown in FIG. 3, to an unlocked position where the shaft can be removed from the chuck;

FIG. 5 is a fragmentary, elevational, side view, from the left as viewed in FIG. 1, of the mechanism shown therein, the section being taken along the line 5—5 in FIG. 1;

FIG. 6 is a view similar to FIG. 1 with the housing of the mixer drive unit broken away showing the guard for the chuck mechanism in lowered position and the shaft being removed;

FIG. 7 is a sectional view along the line 7—7 in FIG. 6;

FIG. 11A is a sectional view taken along the line 11A—11A in FIG. 11;

Figure 1:
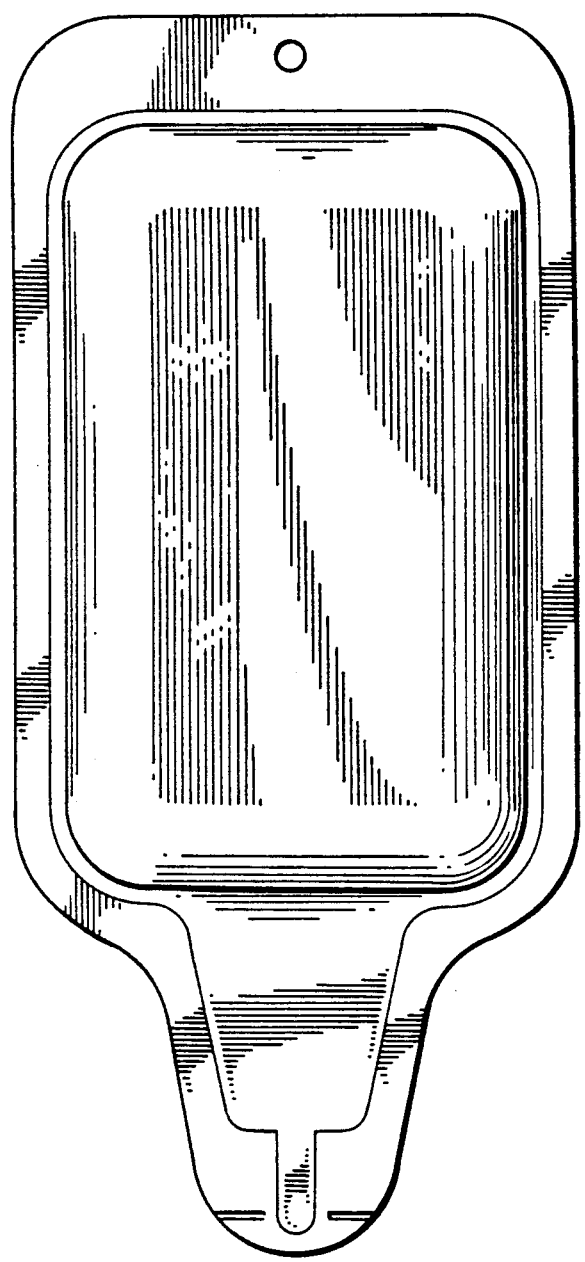
Figure 2:
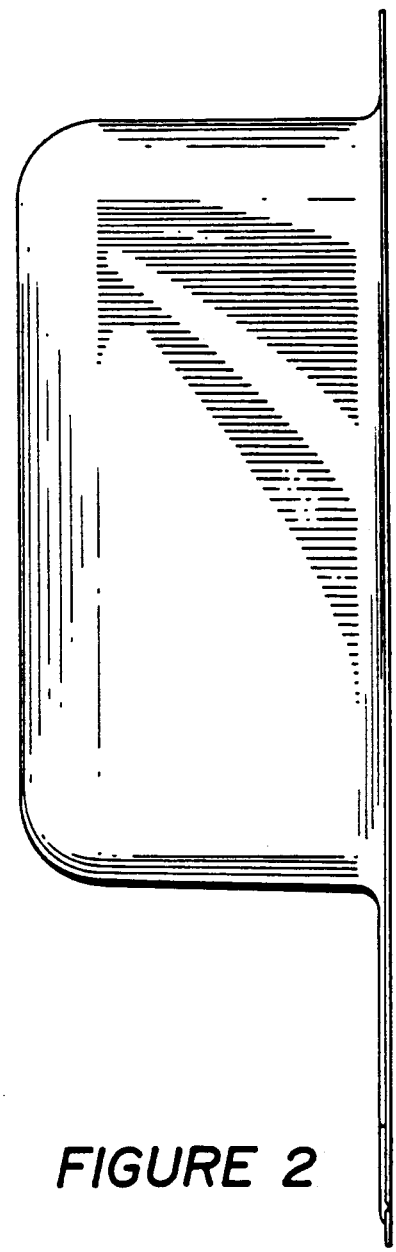

Referring to FIGS. 1 through 7, there is shown a mixer drive unit 10 having a housing 12. The housing 12 may be a casting which supports the motor and gear train of the mixer drive unit. The connection of the housing to the motor and its gear train is made by bolts 14 which extend through holes in the housing and then into a frame (not shown) which supports the motor and gear box of the mixer drive unit 10. A shaft 16 extends from the gear box. If a direct drive is used, the shaft 16 is the motor shaft. A cover 18 encompasses the motor and gear box of the drive unit. A shield or guard 20 is connected to the depending portion 22 of the housing 12 by hooks or clips 24 which either engage a groove 26, when the shield 20 is in the working position as shown in FIGS. 1 and 5, or rests on the bottom of access holes 28 as shown in FIG. 6 when the guard 20 is lowered so as to provide access through the holes 28 to the chuck mechanism 30. The chuck mechanism 30 is located in the depending portion 22 of the housing and is rotatably mounted in ball bearings 32 and 34.

The chuck mechanism 30 receives and detachably retains the output shaft 36. This output shaft is the impeller shaft of the mixer and has an impeller or propeller (not shown) mounted thereon. This impeller is designed to mix or blend a liquid or liquid suspension or slurry. This mixing action presents a load which applies torque and thrust forces (around and along the axis of rotation of the shaft, respectively) as the shaft is rotated. The top end 40 of the shaft 36 is chamfered to enable it to be inserted past a detent key 42 of the clutch mechanism 30. The chamfer is shown at 44 and is suitably approximately 30° to the axis of rotation.

The chuck mechanism has a tubular member 48 which defines the chuck that holds the shaft 36. This tubular member is also a sleeve or inner collar 48 having a central opening 50 coaxial with the axis of rotation of the shaft 36 into which the shaft 36 is inserted and held when the shaft is located in locking position in the chuck mechanism. This locking position is illustrated in FIGS. 1, 2, 3, 3A and 5. The inner collar 48 is journaled in the bearings 32 and 34 and held in place by shoulders and grooves thereon in which lock rings 51 are disposed. The drive shaft 16 is connected by a key 52 to the inner collar 48.

A blind slot 54 which extends radially partially through the outer collar 80 defines part of a keyway for the key 42. This keyway slot 54 is oblong and has side walls 56 and 58 which are stepped to engage steps 60 and 62 which run longitudinally (in the direction of the axis of rotation) along the side walls 64 and 66 of the key 42. An endless elastic band, preferably an O-ring 68 is disposed in an annular groove 70 around the outer periphery of the inner collar 48 and a groove 72 in the outside of the detent key 42. This O-ring yieldably biases the detent key in a radially inward direction. The key is captured between the steps in the side walls 64 and 66 and the O-ring 68. The key is therefore a detent and can be detented by the mixer shaft 36 when it is inserted into the central opening 50 and rotated between unlocked and locking positions. An unlocked position is shown in FIG. 4. Twisting the shaft 36 to unlocked position enables the shaft 36 to be removed, as illustrated in FIG. 6.

The shaft 36 is undercut to provide a groove 74 having a base and side walls. This groove 74 provides part of the keyway with the slot 54 when the mixer shaft 36 is in the locking position. The distance between the upper and lower side walls of the groove 74 is approximately equal to the length of the detent key 42 so that the key is held with a minimum of chattering in response to thrust forces on the shaft 36. The base of the groove 74, which is best shown at 78 in the cross sectional views (FIGS. 2–4 and 7), is a flat which is parallel to the axis of rotation of the shaft. This flat engages the inside surface 81 of the key and facilitates the transfer of torque through the outer collar to the mixer shaft 36 by providing wedging action as is illustrated in FIG. 3A.

The chuck mechanism 30 outer collar 80 encompasses the inner collar 48 and the detent key 42. The outer collar 80 has a blind slot 84 extending radially outward from its inner periphery. This slot is at least as long the detent key 42, but is preferably equal in length and of the same shape as the keyway slot 54. Instead of a blind slot, the slot 84 may be a through slot. Also, another slot may be located 180° away from the slot 84, (see the slot 84" in FIGS. 9 and 10), when it is desirable to limit the distance the outer collar 80 need be turned in order to lock the chuck mechanism when the shaft 36 is in the locking position.

A hole 86 in the outer collar 80 receives a set screw 88 which may be tightened with an Allen head wrench. The wrench may also be inserted through the access holes 28 and used as a lever to turn the outer collar 80 between the position thereof as shown in FIG. 3 where the key 42 is locked and the position shown in FIG. 2 which enables the shaft 36 to be twisted, for example, to the position shown in FIG. 4. This detents or moves the key 42 radially outward and allows the shaft 36 to be withdrawn as shown in FIG. 6. The set screw 88 is optional and can provide additional security against movement of the chuck mechanism out of its locking position. Instead of the set screw being tightened in the position shown in FIG. 3, the collar 80 may be turned 180° and the set screw can be brought down to bear against the detent key 42.

Locking action and transfer of torque is enhanced because, as shown in FIG. 3A, the flat at the base of the groove 74 tilts the key 42 as the shaft turns. FIG. 3A shows rotation of the shaft in the clockwise direction which tilts the key to define a surface which wedges the inner periphery of the outer collar in locked position; further tightening the key in place and reducing vibration or chattering when the mixer is working (dynamic operation) and transferring torque and absorbing thrust from the load (the liquid or liquid suspension) being mixed.

The shaft 36 may be replaced with the guard 20 down by inserting the shaft into the central opening 50 and rotating it until the detent key 42 clicks into place. The outer collar is then rotated to lock the shaft in its locking position. The set screw 88 is then tightened. To replace the shaft, the set screw is loosened and the outer collar rotated to the position shown in FIGS. 2 and 7. Then the shaft 38 may be twisted so as to detent the detent key 42. When the shaft is removed as shown in FIG. 6, the detent key 42 moves inwardly to the position shown in FIGS. 6 and 7 and is ready to receive a replacement shaft.

Figure 8:
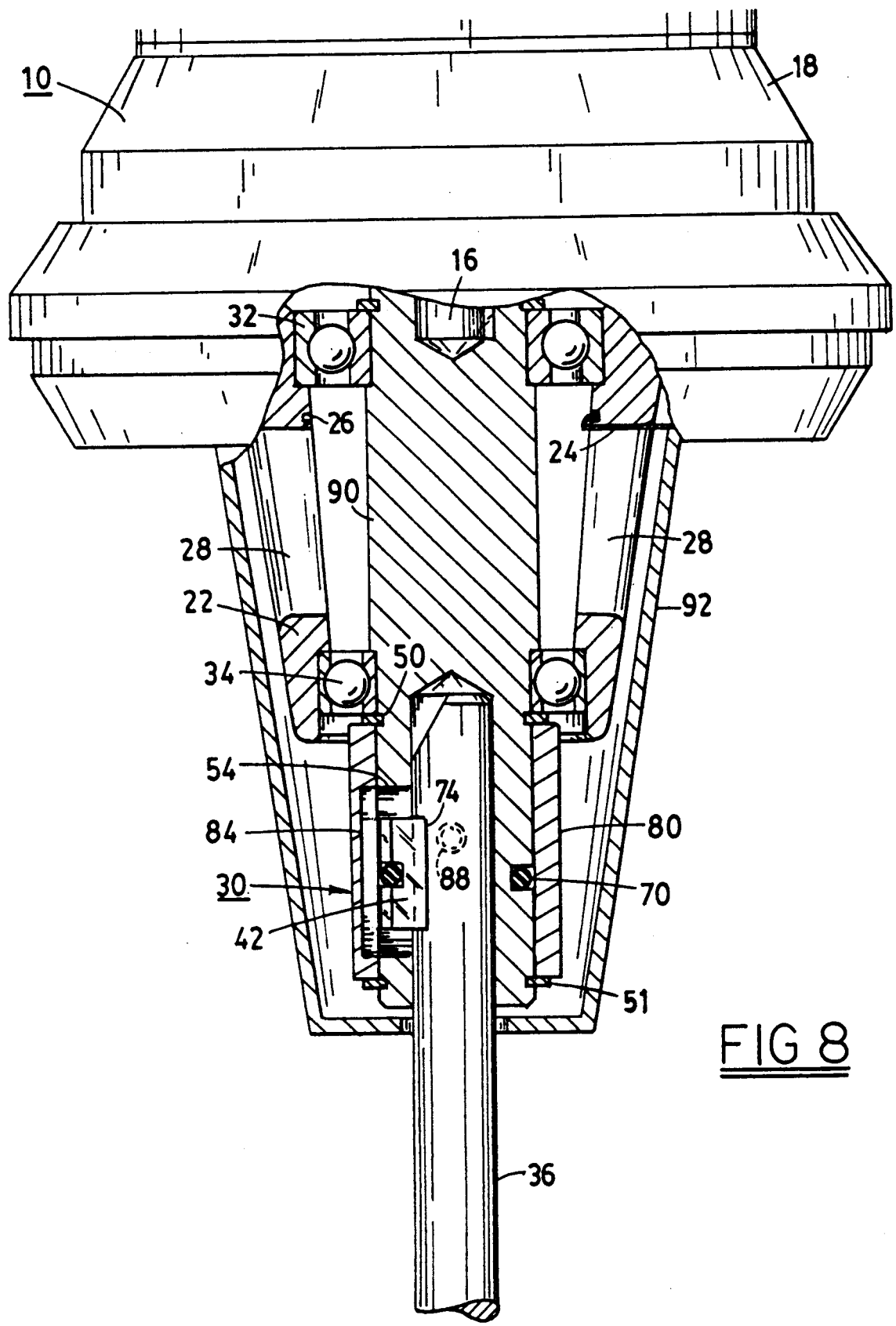
FIG. 8 is a elevational view of a mixer drive unit and chuck mechanism similar to that shown in FIG. 1 but with a longer spindle such that the chuck mechanism is disposed below the frame work of the housing of the motor drive unit.

Referring to FIG. 8, there is shown another embodiment having a chuck mechanism 30 similar to that shown in FIGS. 1 through 7. A spindle 90 is used which is longer than the spindle or inner collar 48. This enables the chuck mechanism to depend below the bearings 34. This may be desirable under some circumstances since it facilitates the removal of the chuck mechanism when maintenance is needed. In the embodiment shown in FIG. 8, the guard 92 is longer than the guard 20 and is removed by completely detaching the spring clips and bowing them inwardly so that they clear the bottom of the access holes 28.

Figure 9:
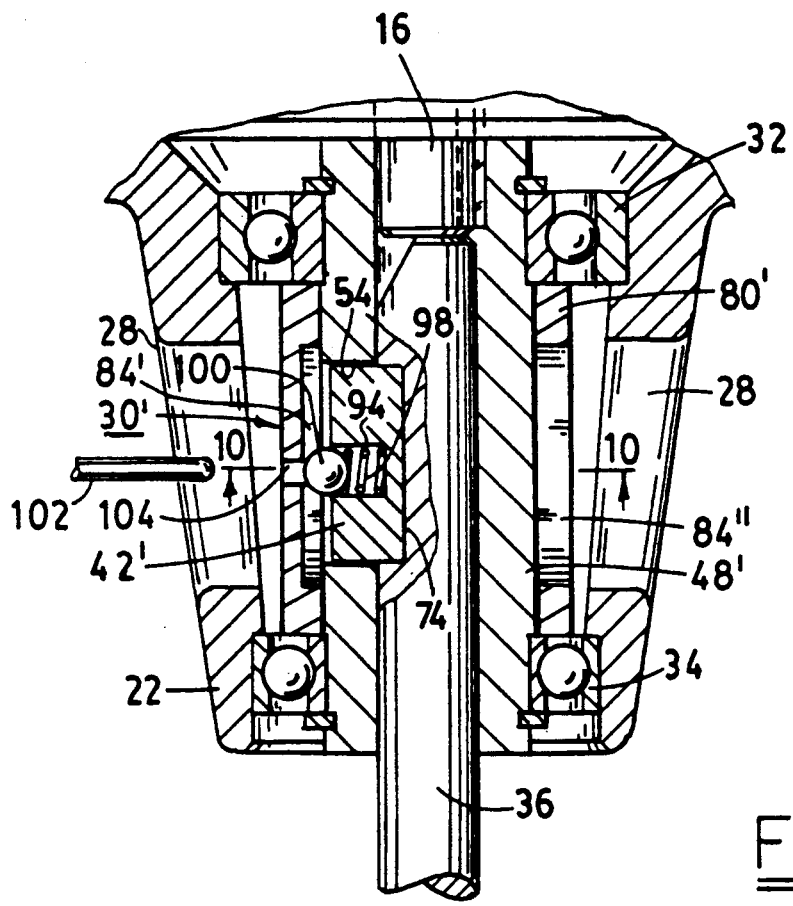
FIG. 9 is a fragmentary elevational view of a chuck mechanism, which like the mechanism shown in FIGS. 1-8, also uses a detent key, but is provided with other means for biasing the key into locking position, in accordance with another embodiment of the invention.
Figure 10:
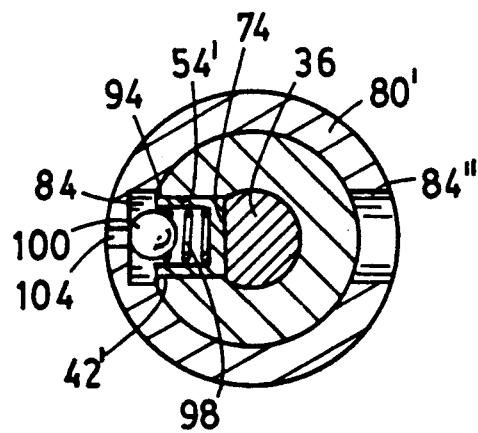
FIG. 10 is a sectional view along the line 10—10 of FIG. 9.

Referring to FIGS. 9 and 10, there is shown another embodiment of the clutch mechanism 30' wherein the inner collar 48 is of length (along the axis of rotation) approximately equal to the length of the detent key 42'. The blind or relief slot 84' in the slot 84", 180° from the relief slot 84' so that only one-half the amount of rotation is needed to find the position of the outer collar 80' which enables the shaft 36 to be inserted and removed. The detent key 42' has a central hole 94 with a compression spring 98 therein. A ball 100, which may be a ball bearing of diameter approximately equal to the diameter of the hole 94, is retained in the relief slot and enables the detent key to be moved outwardly. In order to release the detent key, a pin 102 may be inserted through a hole 104 to depress the ball 100. When the outer collar 80' is turned, the spring 98 is fully compressed and serves to lock the detent key in place.

Figure 11:
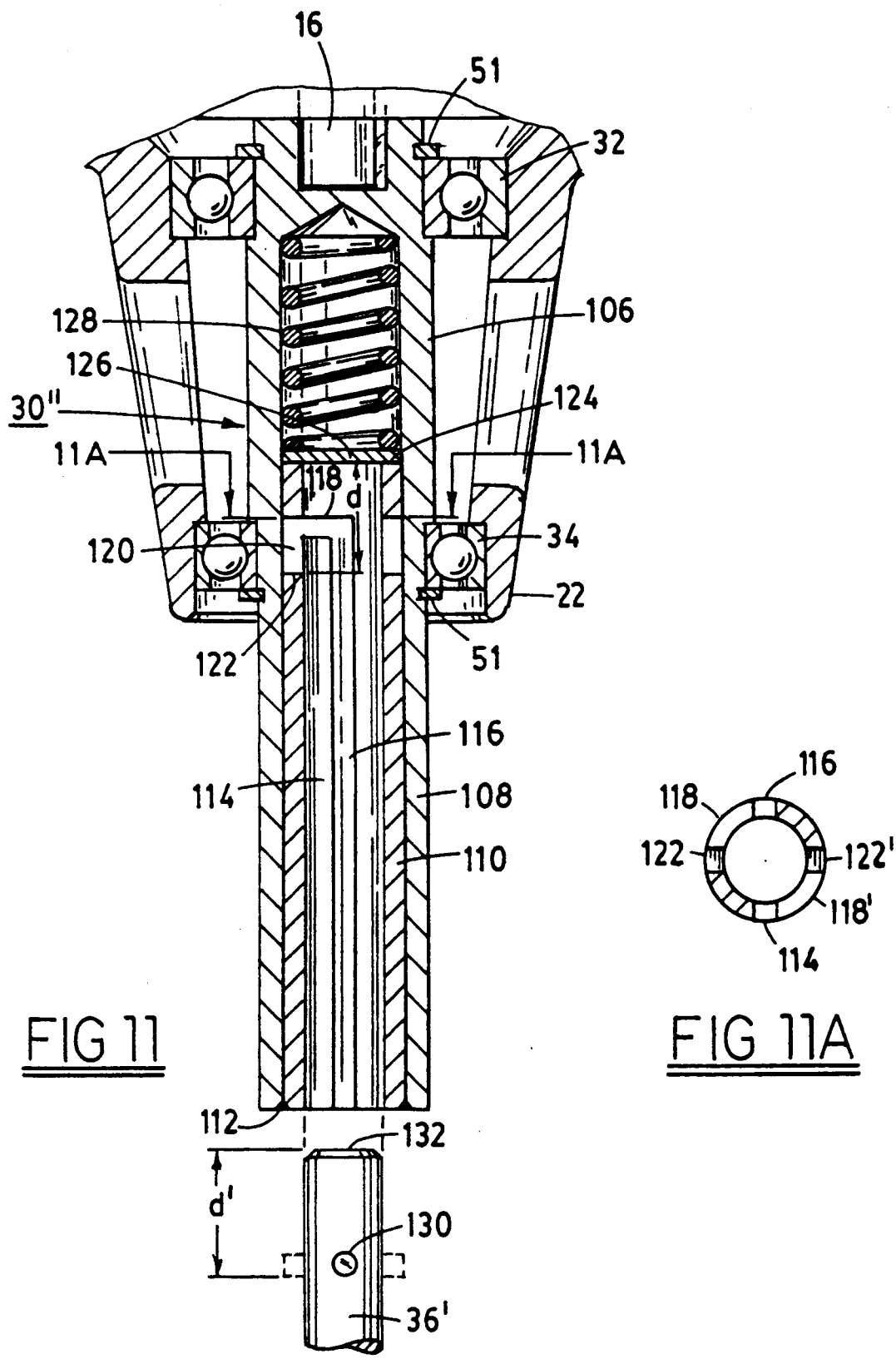
FIG. 11 is a fragmentary, elevational view of a chuck mechanism in accordance with another embodiment of the invention.

Referring to FIGS. 11 and 11A, there is shown another clutch mechanism, 30" having a spindle or collar 106 made of inner and outer tubes 108 and 110 which are welded together by an annular weld 112. The inner tube 110 has a pair of keyways 114 and 116 which are 180° from each other. These keyways, are defined by slots having three portions, namely, portions 116, circular portion 118, and a retroverted portions 120 which extend to an end 122 thereof. Corresponding portions of the other of the pair of keyways are labeled by like reference numerals with a prime appended thereto.

Above the upper end 124 of the inner tube 110 there is a detent provided by a washer 126 and a compression spring 128. The distance between the bottom end 122 of the retroverted portion 120 and upper end 124 is indicated as "d". The mixer shaft 36' has a cross pin 130 and which define keys. The distance d' between the bottom of the pin 130 and the upper end 132 of the shaft 36' is longer than the distance d by at least the diameter of the pin 130. The shaft 36 may be inserted when it is not in its locking position (the position shown at 130). The locking position of the pin 130 is shown at 130' by the dashed lines. The shaft is moved into the locking position by twisting the shaft 90° so that the pin 130 overlies the retroverted portions 120 and 120' of the keyways. Then, when the shaft is released, the detent washer 126 yieldably biases the pin 130 to the bottoms 122 and 122' of the retroverted portions. Rotation of the spindle 106 in either direction is operative to transfer torque via the pin 130 to the shaft 36'.

The use of a spindle 106 extending below the bearings is preferred since it provides a long surface to oppose bending of the shaft 36'. The spring 128 is desirably sufficiently stiff to provide a hold-down force which opposes the thrust load from the impeller shaft 36'. It will be appreciated that the spindle 106 may be made as a one-piece body and access provided through the top of the spindle with suitable locking nuts so as to enable insertion of the detent washer 126 and spring 128.

Figure 12:
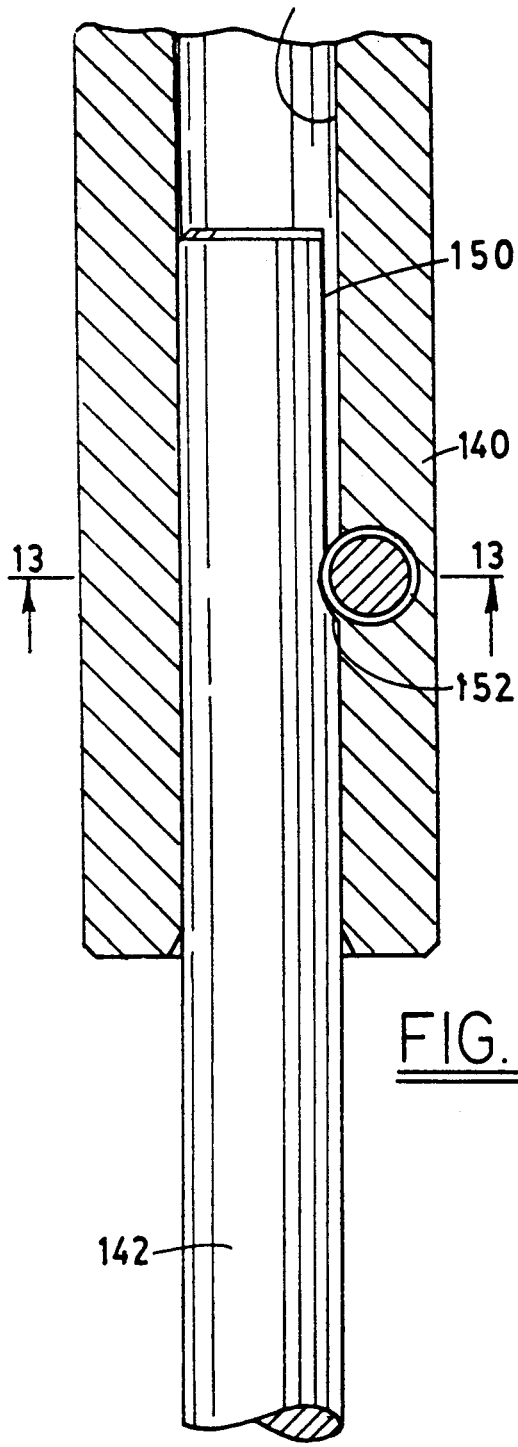
FIG. 12 is a fragmentary elevational view of a coupling mechanism in accordance with a still further embodiment of the invention.
Figure 13:
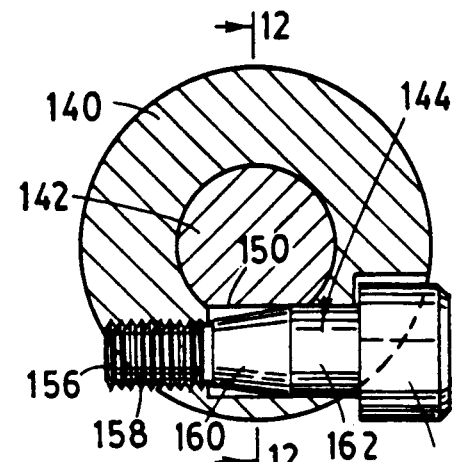
FIG. 13 is a sectional view along the line 13—13 of FIG. 12.
Figure 14:
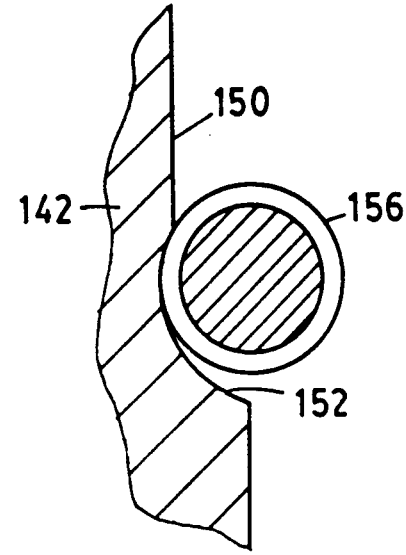
FIG. 14 is a fragmentary view of a portion of FIG. 12 showing the tapered bolt key in engagement with the frustro-cylindrical surface at the end of the flat of the output shaft which is shown somewhat smaller in FIG. 12.

Referring to FIGS. 12, 13 and 14, there is shown a collar or spindle 140 and a mixer output shaft 142. A keyway is provided by a cross bore 144 having an axis parallel to a diameter of the spindle and off-set from the diameter so that the cross bore intersects a portion of the central opening 146 which is coaxial with the axis of rotation of the shaft. The shaft 142 has a flat 150 undercut with a radius 152 at the bottom thereof. This flat and particularly the radius portion thereof (which defines a frustro-cylindrical surface) defines with the cross bore the keyway of the clutch mechanism.

The key of the mechanism is provided by a bolt 156 having a threaded end portion 158, a tapered portion 160, a cylindrical portion 162, and a head 164. The head may have a blind hex hole for insertion of an Allen head wrench. The radius of the undercut is preferably equal to the radius of the portion of the cross bore which receives the cylindrical portion 162 of the bolt 156. The part of the cross bore which receives the threaded portion 158 is threaded.

In operation, the bolt is partially inserted so that approximately one-half of the threaded portion 160 is in the keyway. The threaded portion 160 then defines a guide which enables the shaft to be inserted in only one angular position, which is the position shown in the drawing, where the flat 150 parallels the keyway portion of the cross bore 144. This is the locking position of the clutch mechanism. Only when the shaft is in the locking position can the tapered bolt be tightened to the full length of the threaded portion 152 without the taper engaging the flat 150. The cylindrical portion may be made somewhat longer than shown to provide sufficient length to transfer the torque through the key (the tapered bolt) without excessive stress on the corner of the flat 150. When the bolt 156 is screwed in as shown in FIG. 13, the shaft 142 is turned so that the flat 150 lines up with the tapered portion 160.

From the foregoing description it will be apparent that there has been provided improved chuck mechanisms which enable quick disconnect coupling of a shaft, for example, a mixer shaft, to a drive. Variations and modifications of the herein described chuck mechanisms within the scope of the invention will undoubtedly suggest themselves to those skilled in the art. Accordingly, the foregoing description should be taken as illustrative and not in a limiting sense.

We claim:

1. A mechanism which detachably couples a rotatable drive member to a shaft, which mechanism comprises a collar rotatably connected to said drive member, a shaft receivable in said collar in coaxial relationship therewith, said shaft and said collar being rotatable independently of each other about their axis into and out of locking position, a keyway in at least one of said shaft and said collar, and a key captured in and rotatable with said one of said shaft and collar, said locking position being defined when said shaft and collar are rotated to bring said key and keyway into alignment, and manually actuable means engagable with said key for releasably retaining it in said locking position.

2. The mechanism according to claim 1 wherein said keyway is defined by a slot extending radially of said collar and an indentation in said shaft which are disposed in aligned relationship when said shaft is in said locking position, said key being radially moveable in said keyway into interlocking relationship between said collar and said shaft, and a sleeve rotatable about said collar, said sleeve having a slot into which said key is moveable when said shaft is out of locking position, said sleeve providing said means engageable with and for retaining said key when rotated to move said slot out of alignment with said key.

3. The mechanism according to claim 2 wherein said keyway is wider than said key and said indentation is provided by a flat on said shaft whereby said key is tiltable to define a wedge between said collar and said sleeve when said shaft rotates.

4. The mechanism according to claim 2 further comprise means yieldably biasing said key in a radially inward direction toward said shaft.

5. The mechanism according to claim 4 wherein said biasing means comprises an elastic ring around said collar and over said key.

6. The mechanism according to claim 5 wherein said biasing means further comprises a first groove extending around the outer periphery of said collar and a second groove in a surface of said key which faces said sleeve, said first and second grooves being in alignment, and said ring being disposed in said aligned grooves.

7. The mechanism according to claim 6 wherein said keyway and said key have steps which are engageable, said key being captured between said keyway steps and said ring.

8. The mechanism according to claim 2 further comprising a set screw threaded in said sleeve, said set screw being engageable with one of said key and said collar when said shaft and collar are in locking position.

9. The mechanism according to claim 4 wherein said biasing means comprises a hole radially disposed in said collar, a spring captured in said hole, a ball detent disposed in said hole and between said sleeve and said collar, said ball being moveable into said slot in said sleeve to enable such shaft to be rotated out of locking position and to be removed from said collar when said slot is aligned with said key.

10. The mechanism according to claim 1 wherein said collar has a central opening and has an open end for receiving said shaft therein from said open end, said keyway is at least one slot extending longitudinally of said collar along the periphery of said central opening, around said periphery and retrovertedly in said longitudinal direction to define a closed end of said at least one slot, said key being at least one pin extending radially outward from said shaft a certain distance from an end of said shaft which is received into said central opening when said pin is aligned with said slot, said locking position being the position of said shaft where said shaft is rotated to bring said pin into alignment with the retrovertedly disposed portion of said slot, said biasing means being a detent disposed in said central opening and engageable with said one end of said shaft to bias said pin towards the closed end of said retrovertedly disposed portion of said slot when said shaft is in said locking position.

11. The mechanism according to claim 1 wherein said shaft has a flat which extends from an end of said shaft which is received in a central opening of said collar from an open end of said collar, said collar having a central axis and a cross-bore, said cross-bore being parallel to and spaced from a diameter of said collar, said cross-bore intersecting said central opening and being off-set from said central axis, said keyway being defined by said cross-bore, said flat and said central opening between the intersection of said cross-bore and said flat, said locking position being the position of said shaft where said shaft is rotated about said axis to bring said flat into alignment with said cross-bore, said key being a rod disposed in said cross-bore having a first portion engageable with said flat, said rod being threaded along a second portion thereof, said cross-bore having threads engageable with said second portion to provide said means engageable with said key for releaseably retaining it.

12. The mechanism according to claim 11 wherein said first portion is tapered inwardly toward said second portion.

13. The mechanism according to claim 12 wherein said flat has an undercut defining an annular surface engageable with the tapered first portion.

14. The mechanism according to claim 13 wherein said rod is a bolt having opposite ends, a third cylindrical portion and a head, said head cylindrical third portion tapered first portion and threaded second portion being disposed in the order stated between the opposite ends of said bolt.

15. The mechanism according to claim 1 further comprising a spindle, a housing, bearings rotatably mounting said spindle on said housing, said spindle having portions depending below said bearings, said collar being provided by the depending portion of said spindle.

16. The mechanism according to claim 1 wherein said collar comprises a spindle, a housing, bearings rotatably mounting said collar on said housing, a guard, attaching said guard to said housing in either a working position around said collar and said retaining means, and a second position depending from said housing to provide access to said retaining means and said collar.

17. A chuck mechanism for detachably connecting a shaft to a rotatable drive member which comprises a spindle having a central opening and an open end, said spindle defining a sleeve for receiving said shaft therein from said open end, said shaft having a longitudinal axis of rotation, said shaft having an end which is received into said sleeve and extends a distance sufficient to provide support for said shaft by said sleeve, a groove in said shaft having a base paralleling said axis and side walls paralleling said end of said shaft, a seat in said spindle extending longitudinally along said axis a distance at least equal to the distance between said side walls, a detent key reciprocably moveable in said slot into a locking position where said groove is aligned with said slot, said shaft being removeable from said sleeve when rotated to reciprocate said key radially outward away from said groove, and a collar around said spindle, said collar having an inner periphery with a relief opening in said inner periphery of sufficient size to enable said key to move out of said groove when said shaft is rotated out of said locking position, said collar being rotatable to move said relief opening out of alignment with said key into engagement with said key retaining it in locking position.

18. The mechanism according to claim 17 further comprising means yieldably biasing said key in a radially inward direction toward said shaft.

19. The mechanism according to claim 18 wherein said biasing meams comprises an elastic O-ring around said collar and over said key.

20. The mechanism according to claim 19 wherein said biasing means further comprises a first groove extending around the outer periphery of said sleeve and the second groove in the surface of said key which faces said collar, said first and second grooves being in alignment and said ring being disposed in said aligned grooves.

21. The mechanism according to claim 20 wherein said slot and key have steps which are engageable, said key being captured between said steps in said slot and said ring.

22. The mechanism according to claim 17 wherein said slot is sufficiently wider than said key to enable said key to tilt when torque is applied thereto by the base of said groove, said key having opposite surfaces in engagement with said base and said collar respectively and defining a wedge between said sleeve and said collar when said key is transferring torque to said shaft from said sleeve.

* * * * *

UNITED STATES PATENT AND TRADEMARK OFFICE
CERTIFICATE OF CORRECTION

PATENT NO. : 5,005,843
DATED : April 9, 1991
INVENTOR(S) : Stephen Markle, et al.

It is certified that error appears in the above-identified patent and that said Letters Patent is hereby corrected as shown below:

On the title page, in item [75]

The inventors should read:

Stephen Markle, Rochester; William Hutchings; Fairport;

Marlin Schutte; Richard Howk; both of Rochester; and

David Engel, Springwater, all of N.Y.

Signed and Sealed this

Eleventh Day of August, 1992

Attest:

DOUGLAS B. COMER

*Attesting Officer*  *Acting Commissioner of Patents and Trademarks*